United States Patent Office 3,448,096
Patented June 3, 1969

3,448,096
LIGNOSULFONATE DISPERSING AGENTS AND
PROCESS FOR PRODUCING SAME
Dale W. Read, West Vancouver, British Columbia, Canada, assignor to Canadian International Paper Company, Montreal, Quebec, Canada, a corporation of Canada
No Drawing. Filed Nov. 25, 1966, Ser. No. 596,804
Int. Cl. C04b 7/56; C07g 1/00; C11d 15/00
U.S. Cl. 260—124                                           8 Claims This invention is concerned with the preparation of an improved dispersing agent from spent liquor produced in the manufacture of pulp and paper. More specifically, this invention relates to the preparation of a dispersing agent or an agent for admixture for use in concrete or in a cement kiln slurry, by treating calcium or sodium base softwood spent liquor with small amounts of caustic under carefully controlled conditions.

Spent sulphite liquor itself has been used extensively as a dispersing agent and, more specifically, an admixture with concrete. Mixed wtih concrete, its use has afforded the beneficial effects of retarding the setting time and decreasing the amount of mixing water required, with the attendant benefit of a concrete with increased tensile strength. Also, greater workability of plastic concrete when it is placed in forms, and increased air entrainment have resulted from its use. This increased air entrainment gives rise to greater resistance of concrete to weathering. However, these beneficial effects may be increased: unmodified spent sulphite liquor itself does not give maximum dispersing properties.

Perhaps one-quarter of the total solids in spent liquor is sugars. While the retardation in setting time of concrete which is yielded by this material is often advantageous, under certain weather conditions (e.g., in cool weather), the setting time may be extended to an impractical length of time. Therefore, the removal of some or all of the sugars from a lignosulfonate spent liquor is usually desirable.

One object of this invention, then, is the preparation of an agent for admixture or dispersing agent that is essentially free of sugars, so that the difficulties in controlling the setting time of plastic concrete will not occur. Another object of this invention is the preparation of an agent for admixture that is more effective than untreated spent liquor in reducing the water requirements of a cement-water mixture. Another object is the inexpensive preparation of such dispersing agents. Still other objects and benefits will become obvious to those versed in the art as further details of this invention are described.

Other investigators have described the preparation of chemically altered agents for admixture or dispersing agents from spent liquor. J. R. Salvesen, C. Harmon, and W. C. Browning, in U.S. Pat. No. 2,491,832, describe the preparation of such dispersing agents. They heated calcium base spent liquor with caustic and oxidized the mixture by pumping air into it. However, these investigators used weights of caustic equivalent to ½ to ⅔ of the weight of lignin present. These amounts are far in excess of the caustic required in the present invention. Also, their invention involved the additional expense of introducing large amounts of air into the reaction mixture. The present invention does not require any external oxidizing agent.

In another patent (Canadian Pat. No. 487,085), J. R. Salvesen and C. Harmon describe the preparation of a dispersing agent from spent liquor. However, they first had to prepare a calcium- and magnesium-free sodium lignosulfonate from their calcium-base spent liquor. Also, they required large amounts of caustic in the preparation of this sodium lignosulfonate, together with 8 to 25 g. of free caustic per litre so that the final pH was in excess of 10.5; their product did not dissolve at pH's below 10.5. On the other hand, the product of the present invention requires only a small amount of caustic in its preparation; it is essentially completely soluble at pH 4 to 5. This marked difference in solubility clearly demonstrates that the product described in the present invention is not only very different in nature, but also requires much less caustic in its preparation. This decrease in caustic requirement is in itself of marked benefit in the manufacture of a product that is economically competitive.

C. Adolphson and E. G. King, in Canadian Pat. No. 691,362, describe the preparation of a drilling mud additive from spent liquor. They heated spent liquor at 40 to 120° C. for periods of from 30 minutes to two weeks with sufficient base to give a final pH of from 7 to 10. These inventors used more base than is employed in the present invention. Their temperature range is below that employed in the present invention. Their temperature range is below that employed in the present invention, and their reaction time range is in excess of that employed in the present invention. That is, the present invention has the advantage of requiring less caustic than the process described by Adolphson and King. Also, the higher reaction temperature and shorter reaction time provide an obvious advantage in economic operation of the process.

In accordance with the present invention, calcium- or sodium-base softwood or hardwood spent sulphite liquor is heated with sodium hydroxide in amounts varying from 4 to 10 g. per litre of liquor. The reaction time is from 4 to 40 minutes, and the reaction temperature is 200° C. or higher. The final pH can vary from 7.0 down to 4.0. The solids content of the liquor can vary up to about 20%. The upper limits of reaction time, temperature, and solids contents are governed by the point at which precipitation of the product commences. The corresponding lower limits are governed by the conditions below which sufficient reaction, probably condensation, of the sulphite liquor solids fails to occur.

The resulting liquid reaction mixture is tested as follows: A volume which contains 0.78 g. (0.2% of the weight of cement used in the test) is made up to a total of 210 ml. with distilled water. Then, a 390 g. sample of dry, screened (#80 mesh) portland cement is added with stirring. The temperature of the stirred slurry is adjusted to 25° C.±0.5° C., and the viscosity is measured with a Brookfield viscometer using a No. 2 spindle.

Because of thixotropic effects, the viscosity determination is carried out in a specially constructed apparatus which is kept in motion throughout the test. The cement-admixture-water slurry is mixed and tested in an iron cylinder, 3″ in internal diameter and 5″ deep, with ⅛″ thick walls. To the bottom of this iron cup is welded an iron rod, 12″ long and ¼″ in diameter. The bottom of this rod is supported by a "Vibro Mixer"; the top of the rod, just below the bottom of the cup, is held in place with three strong elastic bands which are held by rods equidistant from each other. Looking down on the apparatus, the cup appears to be in the center of an equilateral triangle, whose apices are represented by the rods supporting the elastic bands.

The following table illustrates reaction limits involved in the present invention. Unless otherwise specified, calcium-base softwood spent liquor at ca. 12% to 13% solids content was used, and the time at the reaction temperature was 10 min. For testing, reaction solution volumes containing 0.78 g. of solids were employed.

TABLE I

| Liquor type | Weight caustic g. | pH after reaction | Reaction temperature, °C. | Viscosity of cement slurry, centipoises |
|---|---|---|---|---|
| (1) | | | | 750 |
| (2) | | | | 450 |
| Calcium base softwood liquor | 40 | 9.9 | 200 | 440 |
| Do | 27 | 8.0 | 200 | 380 |
| Do | 13 | 5.0 | 200 | 430 |
| Do | 7 | 4.0 | 200 | 460 |
| Do | 40 | 9.6 | 225 | 450 |
| Do | 27 | 7.7 | 225 | 400 |
| Do | 10 | 5.5 | 225 | 380 |
| Do | 7 | 4.7 | 225 | 280 |
| Do | 5 | 4.3 | 225 | 300 |
| Do | 4 | 4.1 | 225 | 350 |
| Do | 3 | | 225 | 460 |
| Do | 24 | 7.9 | 250 | 500 |
| Do | 7 | 6.5 | 250 | 420 |
| Do | 7 | 4.2 | 235 | 420 |
| Do | 7 | 4.7 | 3 225 | 380 |
| Do | 7 | 4.5 | 4 225 | 5 300 |
| Do | 7 | 4.4 | 4 225 | 6 400 |
| Mixed calcium & ammonium base; hexoses removed by fermentation | (7) | 6.4 | 8 225 | 450 |
| Calcium base softwood liquor | (9) | 4.7 | 8 225 | 380 |
| Calcium base hardwood liquor | (7) | | 8 225 | 300 |

1 Blank (no lignin).
2 Blank (0.78 g. of evaporated untreated spent softwoods liquor).
3 For 40 min.
4 For 10 min.
5 Using 15% solids content.
6 Using 18% solids content (much product precipitated from solution).
7 7 g. NaOH.
8 Time at the reaction temperature was 10 minutes.
9 25 ml. of 28% ammonium hydroxide.

A preferred set of reaction conditions include the following: a 1.0 litre sample of calcium base softwood or hardwood spent liquor of from 11 to 14% solids content is heated in the presence of 7 g. of sodium hydroxide to 225±5° C. over a period of a half hour, and maintained at that temperature for ten minutes. After rapid cooling, the reaction solution can be used directly as a dispersant, it may be concentrated to any convenient solids content, or is may be evaporated to dryness for ease of handling. This latter method is preferred for long shelf life.

The product is essentially completely water soluble: it requires no extra caustic to effect solution, even after storing the dried product for 1 year.

Essentially all the sugars are destroyed in this treatment. Analysis of the dried product indicates the presence of less than 2% carbohydrate material, as compared with ca. 30% in the original.

This product is also effective as a water-reducing agent or viscosity-reducing agent when used in the aqueous slurry of finely divided material used to prepare portland cement, as illustrated in Table II.

Table II

| | Percent |
|---|---|
| Water content of cement kiln feed slurry, as received | 35.0 |
| Water content of feed slurry, after addition of 0.2% of the previously described lignin, and evaporation until the viscosity reaches that of the additive-free blank | 21.0 |
| Therefore, the reduction in water content at blank viscosity is | 40.0 |

Although the chemical and physical changes which occur during this process are still not completely understood, the excellent properties of the modified lignin product are believed due to two factors. These are the destruction of the sugars present, and the controlled condensation of the lignosulphonate to a molecular weight optimum for dispersing action.

The benefits of removing sugars from a cement admixture have been discussed above, and no further elaboration of this point is necessary. Although the solids present in the original liquor contain approximately 30% of reducing sugars, treatment of the liquor under the conditions of the present process, with as little as 7 g./l. of NaOH, is sufficient to reduce the sugar content of the product to less than 2%.

Rezanowich et al. (Pulp & Paper Magazine of Canada, 62, Convention Issue, pp. 172–181, 1961) have demonstrated the importance of the molecular weight in determining the dispersing power of lignosulphonates. It has been found the dispersants prepared by the present invention have molecular weights very close to the value of 50,000 found to be the optimum by Rezanowich et al. Since this value is substantially higher than the average molecular weight of the lignosulphonate in the original liquor, it is obvious that some condensation must have occurred during the alkaline treatment. The extent of condensation which occurs during the process will depend on the temperature of the treatment and the amount of caustic added. If the caustic addition is too low, the final pH of the reaction mixture will be on the acid side, and condensation of the lignin will be excessive. If too much caustic is added, however, degradation of the lignin excessive desulphonation. The degree of condensation will also increase with increasing temperature, at least up to reasonable temperature levels, and a careful balance must be found here as well. Under the conditions of the present invention, this balance is obtained at $$225° \pm 5° \text{ C.}$$

and a caustic addition of 7 g./l.

What is claimed is:

1. A dispersing agent produced by the process comprising a first step of mixing (a) a solution of spent sulphite liquor containing up to about 18% solids and (b) caustic equivalent to about 4 to to 10 g. NaOH per litre of the spent sulphite liquor and a second step of heating the mixture of the first step to a temperature of from about 200° C. to 250° C. until a reaction evidenced by precipitation ensues.

2. The dispersing agent of claim 1 when the spent sulphite liquor contains from 11% to 14% solids.

3. The dispersing agent of claim 1 when the caustic is present in a ratio of about 7 g. NaOH per litre of spent sulphite liquor.

4. The dispersing agent of claim 1 when the temperature is 225° C.±5° C.

5. A process comprising a first step of mixing (a) a solution of spent sulphite liquor containing up to about 18% solids and (b) caustic equivalent to about 4 to 10 g. NaOH per litre of the spent sulphite liquor and a second step of heating the mixture of the first step to a temperature of from about 200° C. to 250° C. until precipitation commences.

6. The process of claim 5 wherein the spent sulphite liquor contains from about 11% to 14% solids.

7. The process of claim 5 wherein the caustic is about 7 g. NaOH per litre of the spent sulphite liquor.

8. The process of claim 5 wherein the temperature is 225° C.±5° C.

References Cited

UNITED STATES PATENTS

| 2,935,473 | 5/1960 | King et al. | 260—124 XR |
| 2,935,504 | 5/1960 | King et al. | 260—124 |

CHARLES B. PARKER, *Primary Examiner.*

D. R. PHILLIPS, *Assistant Examiner.*

U.S. Cl. X.R.

106—90; 252—352